United States Patent
Holtgraver et al.

(10) Patent No.: US 10,132,337 B2
(45) Date of Patent: Nov. 20, 2018

(54) ACTUATOR ASSEMBLY FOR CONDUCTING PARTIAL STROKE TESTING

(71) Applicant: QTRCO, Inc., Tomball, TX (US)

(72) Inventors: Edward G. Holtgraver, Tomball, TX (US); James R. Howard, Tomball, TX (US)

(73) Assignee: QTRCO, Inc., Tomball, TX (US)

( * ) Notice: Subject to any disclaimer, the term of this patent is extended or adjusted under 35 U.S.C. 154(b) by 195 days.

(21) Appl. No.: 15/140,699

(22) Filed: Apr. 28, 2016

(65) Prior Publication Data

US 2017/0314584 A1 Nov. 2, 2017

(51) Int. Cl.

| F15B 15/14 | (2006.01) |
|---|---|
| F15B 15/28 | (2006.01) |
| F15B 11/12 | (2006.01) |
| F16H 19/04 | (2006.01) |
| F15B 15/06 | (2006.01) |
| F15B 19/00 | (2006.01) |

(52) U.S. Cl.
CPC ........ F15B 15/2815 (2013.01); F15B 11/123 (2013.01); F15B 15/1409 (2013.01); *F15B 15/065* (2013.01); *F15B 15/066* (2013.01); *F15B 15/2807* (2013.01); *F15B 19/005* (2013.01); *F15B 2211/7107* (2013.01); *F16H 19/04* (2013.01)

(58) Field of Classification Search
CPC .. F15B 15/065; F15B 15/066; F15B 15/1409; F15B 2211/7107
See application file for complete search history.

(56) References Cited

U.S. PATENT DOCUMENTS

| 3,261,266 | A | * | 7/1966 | Ledeen | ................... | F15B 15/06 |
|---|---|---|---|---|---|---|
| | | | | | | 251/31 |
| 5,492,050 | A | | 2/1996 | Holtgraver | | |
| 5,789,719 | A | * | 8/1998 | Pary | ..................... | B23K 11/317 |
| | | | | | | 219/86.25 |
| 6,209,443 | B1 | * | 4/2001 | Perez | ..................... | F15B 15/065 |
| | | | | | | 92/136 |
| 6,633,015 | B2 | * | 10/2003 | Nguyen | ................. | B23K 11/31 |
| | | | | | | 219/89 |
| 7,718,916 | B2 | * | 5/2010 | Tenzer | ................. | B23K 11/314 |
| | | | | | | 219/89 |
| 8,087,316 | B2 | | 1/2012 | Holtgraver | | |
| 8,863,596 | B2 | | 10/2014 | Holtgraver | | |

* cited by examiner

*Primary Examiner* — F. Daniel Lopez

(74) *Attorney, Agent, or Firm* — Bushman Werner, P.C.

(57) ABSTRACT

A modular actuator assembly which can be used for partial stroke testing of a valve, the assembly having a force module and a tandem piston module. The force module has a primary piston and piston rod interconnected to a shaft which is movably mounted therein. The tandem piston module is connected to the force module and has a tandem piston and piston rod. An indicator plate is connected to the piston rod and is selectively positionable on the tandem piston rod. The tandem piston rod extends into the force module and acts as a pneumatically engaged hard stop for preventing spurious travel of the primary piston and hence spurious valve travel.

17 Claims, 6 Drawing Sheets

ACTUATOR ASSEMBLY FOR CONDUCTING PARTIAL STROKE TESTING

FIELD OF THE INVENTION

The present invention relates to a partial stroke testing system and, more particularly, to a partial stroke testing system for the online testing of an emergency shut off valve.

BACKGROUND OF THE INVENTION

In the oil, gas, petroleum, and power industries, emergency shutdown of a process must be provided for under certain fault conditions.

An emergency shutdown (ESD) system is usually implemented by pneumatically controlled shut off valves, which generally remain open while the process is operating safely. These valves are usually only closed when an emergency shut down is required, or for maintenance. Often, processes operate for long periods of time, e.g., years, without shutting down. As the shutdown valves are operated infrequently, there is a high possibility that they will stick or freeze when the shutdown operation is required, thus resulting in a dangerous condition if an emergency shutdown has been requested.

The problem can be exacerbated by economic conditions which lead to a reduction in the frequency of shutdowns or turn-arounds. For example, in some operations a process may run continuously for one or more years without shutting down the process for maintenance.

State-of-the-art ESD systems, which control shut-off valves, have a number of features to detect plant or process failures and typically include redundancies for added reliability. However, such systems may not provide for the testing of shut-off valves themselves, other than full stroking the valve. However, the problem with full stroking or completely closing the valve is that it causes an undesirable disruption in the process. To alleviate the problem, partial stroke testing systems have been developed. In a partial stroke test (PST), a valve is partially closed in order to confirm that it is not stuck in an open position.

PST is not only applicable to safety related applications but can also be used to enhance the operation of the valve. For example, in many process applications, the chemical composition of the flowing stream can cause material to build up on the valve internal body and trim surfaces. Over time this build-up may cause the valve to "stick" in that position and not stroke. PST can be used to simply "exercise" the valve while allowing it to partially stroke, keeping the valve surfaces that are required to move free from material build up.

Many PST systems use mechanical hard stop devices which normally require a purpose-built actuator with integral manually engaged travel stops or add-on type manually engaged stops mounted as an interface between the actuator and the valve. These mechanical stops offer the benefits of hard travel stops to prevent spurious over travel and allow full actuator torque output to operate a valve experiencing stiction. However, they suffer from several disadvantages in that they require extensive operator training and procedures both for engagement and disengagement operations. Furthermore, they typically cannot be immediately disengaged should an ESD occur during partial stroke testing. This severely compromises safety.

Other common PST systems have no hard stops but rely instead on the careful release of air pressure to allow the spring inside of the actuator to move the actuator and valve to a desired partial stroke position which is chosen to both provide maximum valve motion without disrupting the controlled process. However, as only a small percentage of the air pressure can be released, the available torque or force output from the actuator is only a very small percentage of the actuator rated torque or force. As a result, a small change in the valve resistance to motion is sufficient to prevent the small actuator output to cause valve motion. In this situation, additional air must be released to develop sufficient actuator output, however, at the resulting pressure the actuator will cause excessive (spurious) valve travel and a resultant process disruption.

In order to prevent spurious motion, designers of such PST systems program pressure and time limits so that if either is exceeded the PS test is aborted. Thus the user has what is called a false failure whereby maintenance must be performed to determine the cause of the failure. Too often nothing is found other than a slight resistance to valve motion. As the process must be shut down for this maintenance action, the PST system causes the very process disruption that it was designed to prevent.

An ideal PST system would eliminate the need for manual engagement while also eliminate the possibility of false failures.

SUMMARY OF THE INVENTION

In one aspect the present invention provides a valve actuator assembly which can be used for PST and which eliminates spurious valve travel.

In another aspect the present inventions provides a valve actuator assembly which can be used for PST and which eliminates false failures.

In another aspect the present invention provides an actuator assembly which can be used for PST but which retains full emergency operation capability.

In yet another aspect, the present invention provides a valve actuator assembly for PST which is modular.

These and further features and advantages of the present invention will become apparent from the following detailed description, wherein reference is made to the figures in the accompanying drawings.

DETAILED DESCRIPTION OF PREFERRED EMBODIMENTS

As used herein, the terms "connected," "interconnected," and "operatively connected," include direct or indirect connection between first and second components, e.g., there may be one or more other components between the first and second component.

The actuator assembly of the present invention can be used with respect to scotch yoke assemblies, rack and pinion assemblies, and linear actuators. With respect to scotch yoke assemblies, U.S. Pat. No. 8,087,316 ('316 patent) and U.S. Pat. No. 8,863,596 ('596 patent), both of which are incorporated herein by reference for all purposes, disclose double acting scotch yoke actuators as set forth in the '316 patent and single acting scotch yoke actuators as set forth in the '596 patent. With respect to rack and pinion type actuators, a double-acting rack and pinion actuator assembly is disclosed in U.S. Pat. No. 5,492,050 ('050 patent) which is incorporated herein by reference for all purposes.

Figures 1, 2:
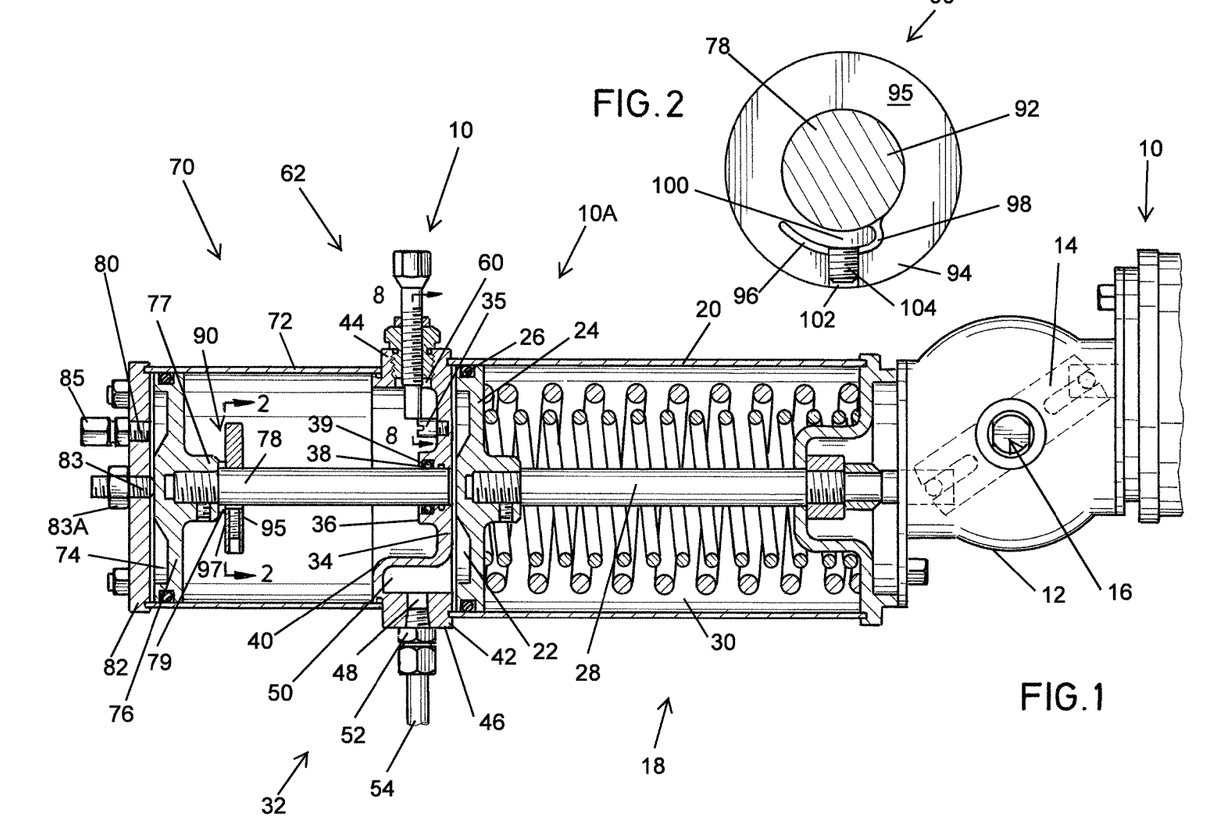
FIG. 1 is a bottom plan view, partly in section of an embodiment of the actuator assembly of the present invention.
FIG. 2 is a cross-sectional view taken along the lines 2-2 of FIG. 1.

Referring first to FIG. 1, the actuator assembly, shown generally as 10, in one embodiment of the present invention, comprises a first force assembly shown generally as 10A connected to one side of a yoke housing 12, there being an identical force assembly 10B connected to an opposite side of housing 12. Since the construction of force assemblies 10A and 10B are identical, only force assembly 10A will be described. As seen and as described in the aforementioned '316 patent and '596 patent, force assemblies 10A and 10B lie generally on diametrically opposite sides of yoke housing 12. Disposed in yoke housing 12, is a dual yoke 14 connected to a rotatable shaft 16, rotation of yoke 14 resulting in rotation of shaft 16. As is well known, shaft 16 can be connected to a driven assembly, e.g., a valve, particularly a quarter turn valve, to open, close, or throttle the valve.

Force assembly 10A comprises a force module 18 comprising a generally cylindrical casing 20 forming a piston chamber 22. Disposed in piston chamber 22 is piston 24 having an annular seal ring 26, piston 24 being connected to a piston rod 28 which in turn is interconnected to one slot of yoke 14 whereby reciprocal motion of piston 24 results in reciprocal motion of piston rod 28 and rotational motion of yoke 14. A compression spring assembly 30, disposed in piston chamber 22 in surrounding relationship to piston rod 28, biases piston 24 in a direction away from yoke housing 12.

There is an interface assembly shown generally as 32 which is interconnected to one end of casing 20 distal yoke housing 12. Interface assembly 32 includes a plate portion 34 on which is formed a generally centrally located hub 36, having an aperture 38 therethrough. Integral with plate portion 34 is an annular, axially extending flange 40 having a first side 42, a second side 44, and an outer peripheral surface 46. There is a threaded fluid port 48 formed through surface 46 of flange 40, port 48 being in open communication with a passageway 50 formed in flange 40, passageway 50 being in open communication with piston chamber 22. A stop 35 in the form of a threaded stud having a screwdriver slot is recessed in a threaded blind bore in plate portion 34.

Threadedly received in port 48 is a fitting 52 connected to a line 54 which is connected to a source of fluid power, e.g. compressed air or hydraulic fluid (not shown). It will be recognized that as compressed air is introduced through line 54, port 48 and passageway 50, it will engage and force piston 24 in a direction toward yoke housing 12 thereby compressing spring assembly 30. Exhausting air through that pathway results in spring assembly 30 returning piston 24 to the position shown in FIG. 1.

There is also a threaded sensor port 60 formed through surface 46 of flange 40, a sensor adaptor shown generally as 62 being threadedly received in port 60, sensor adaptor 62 being described more fully hereafter.

A tandem piston module shown generally as 70 is connected to the flange side of interface assembly 32. Tandem piston module 70 comprises a generally cylindrical cartridge 72 forming a second piston chamber 74. Disposed in second piston chamber 74 is a second piston 76 having an axially extending hub 77 which is connected to second piston rod 78, piston rod 78 being receivable in aperture 38 of hub 36, a seal ring 39 providing sealing between piston rod 78 and the surface forming aperture 38.

A threaded fluid (pneumatic) port 80 is formed in an end cap 82 connected to the end of cartridge 72 distal interface assembly 32 whereby fluid can be introduced into chamber 74. A fitting 84 is threadedly received in port 80 and connected to a source of compressed air or the like. As will be appreciated, as air is introduced through port 80, piston 76 is forced in the direction of interface assembly 52 which, as will be seen more fully hereafter, moves piston rod 78 through the aperture 38 formed in hub 36. An adjustable stop 83 comprising a threaded stop rod and nut is received in a threaded bore 83A in end cap 82.

Turning now to FIG. 2, there is shown an indicator plate 90 having a generally circular aperture 92 therethrough. Indicator plate 90 which can be disc shaped, has an outer peripheral surface 94, a first side 95 and a second side 97. A channel 96 is formed in indicator plate 90 through sides 95 and 97, channel 96 having an arcuate portion in open communication with a connecting channel 98 which in turn is in open communication with aperture 92 through plate 90. Formed between the surfaces of aperture 92 and channels 96 and 98 is a deflectable finger 100. There is a threaded bore 102 formed through the peripheral surface 94 of indicator plate 90, there being a set screw 104 received in threaded bore 102. It will be appreciated that as set screw 104 is tightened, finger 100 is forced radially inwardly into engagement with piston rod 78 thereby securing indicator plate 90 to piston rod 78. It will be appreciated that by loosening set screw 104, indicator plate 90 can be moved longitudinally along piston rod 78 to any desired position and then selectively locked in place in that position without damage to the piston rod 78.

Figure 3:
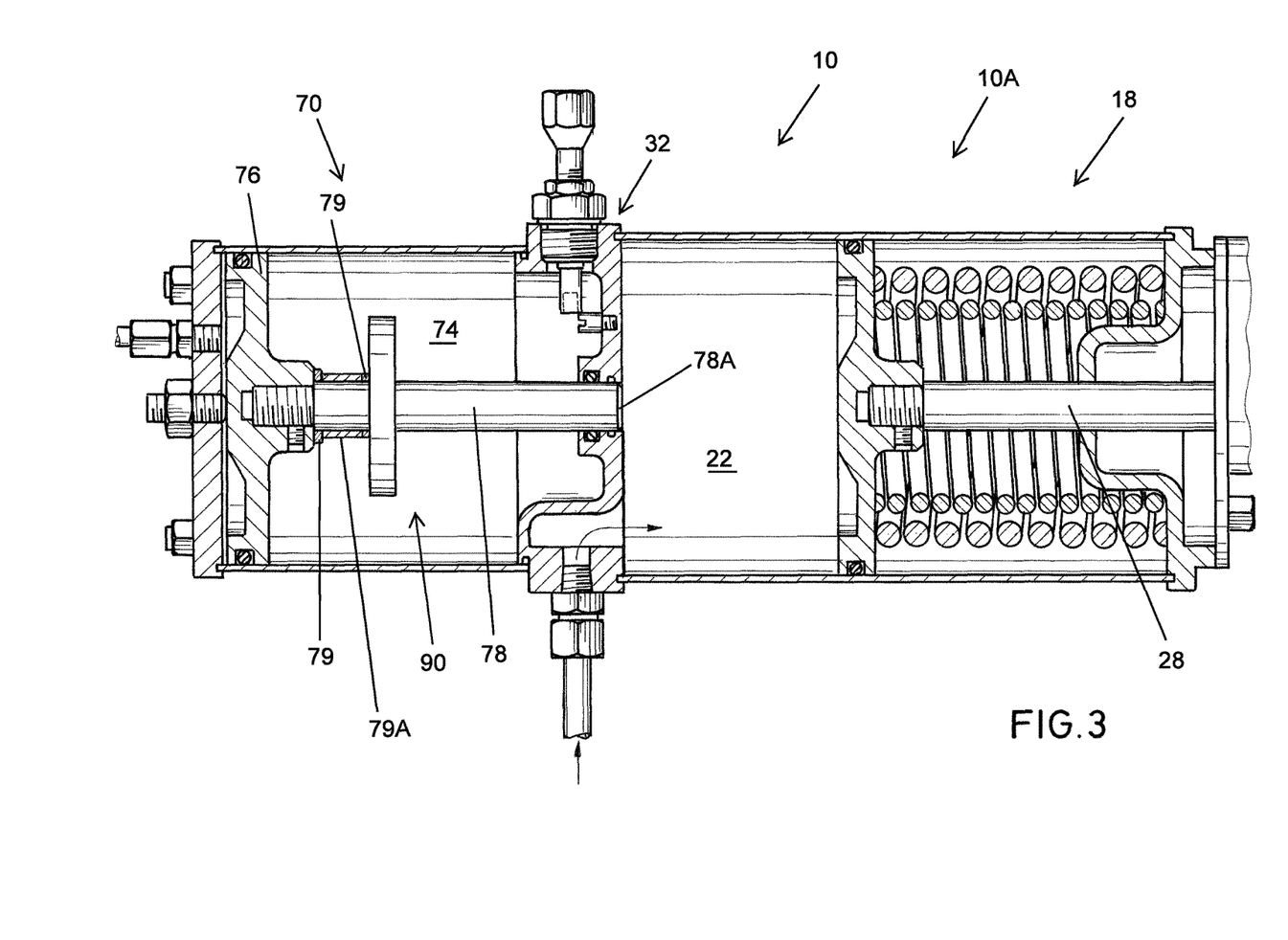
FIG. 3 is an enlarged view showing a portion of the actuator assembly of the present invention in a first position.
Figure 4:
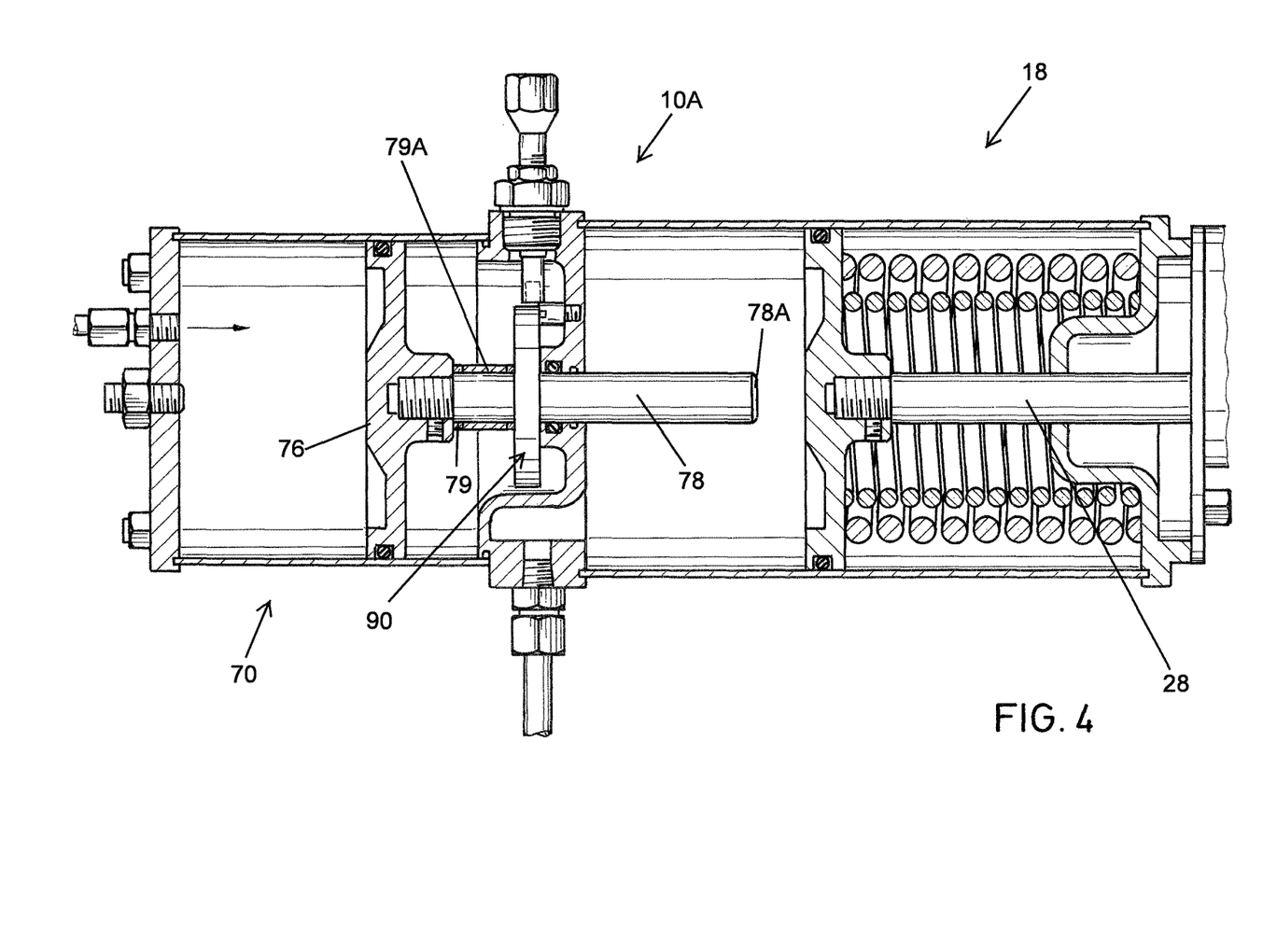
FIG. 4 is a view similar to FIG. 3 showing the actuator assembly of the present invention in a second position.
Figure 5:
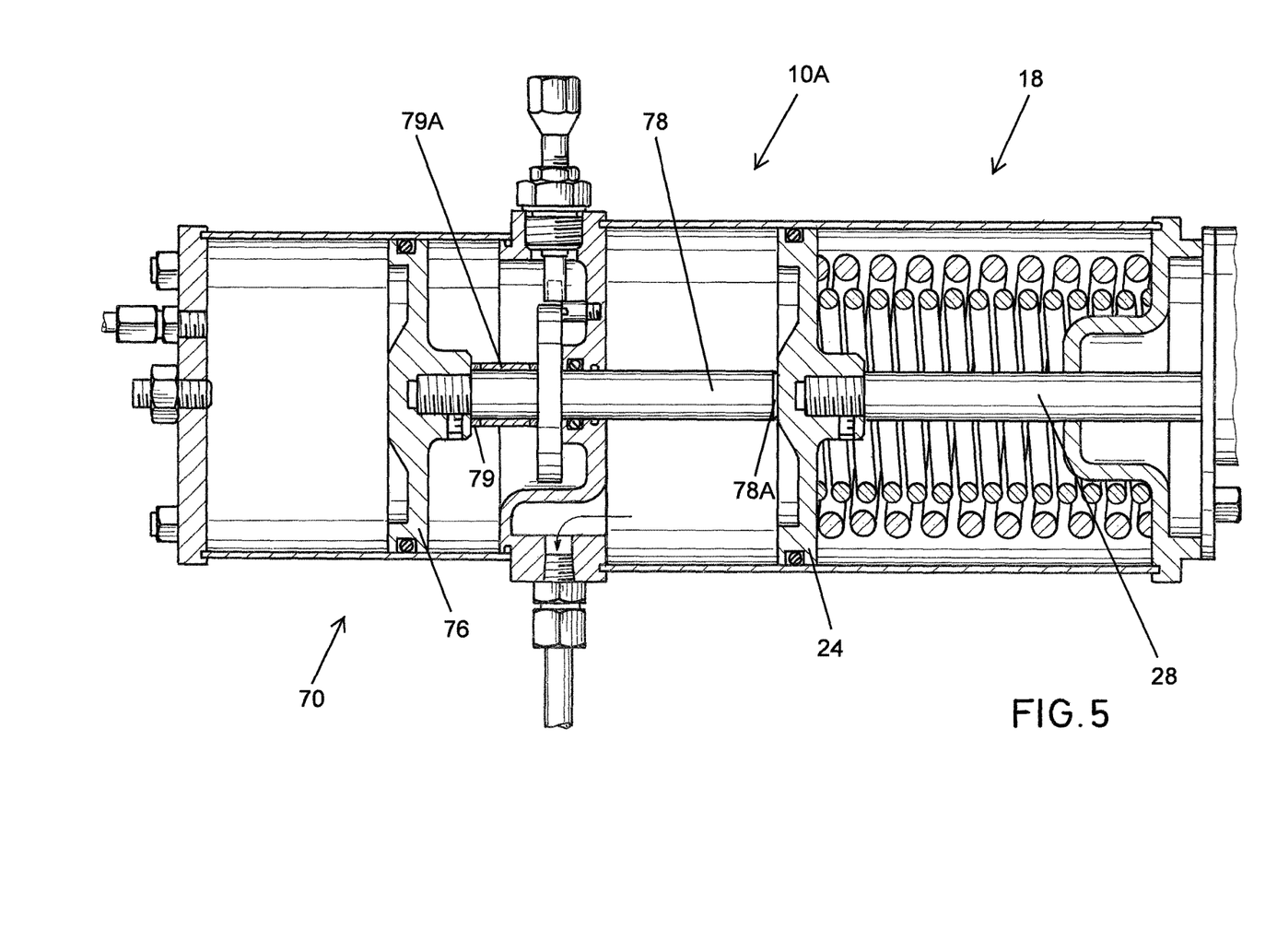
FIG. 5 is a view similar to FIG. 3 showing the actuator assembly of the present invention in a third position.

To ensure that indicator plate 90 remains positioned a desired distance, and depending upon the degree of partial stroke required, from hub 77 of piston 76, one or more spacers can be positioned on piston rod 78 between the hub 77 and indicator plate 90. A single spacer or shim 79 is shown in FIG. 1. It will be appreciated that the number of such shims, spacers, or washers 79 can be varied in accordance with the customer's specifications so as to determine valve travel during the PST. For example, as shown in FIGS. 3, 4, and 5, there are two shims or washers 79 and a spacer collar 79A. Spacers/shims ensure that during a PST, the indicator plate 90 will remain in position on piston rod 78, meaning that indicator plate 90 will always be in register with the sensor used to determine the position of the indicator plate and hence the position of the valve being subjected to the PST.

Figure 6:
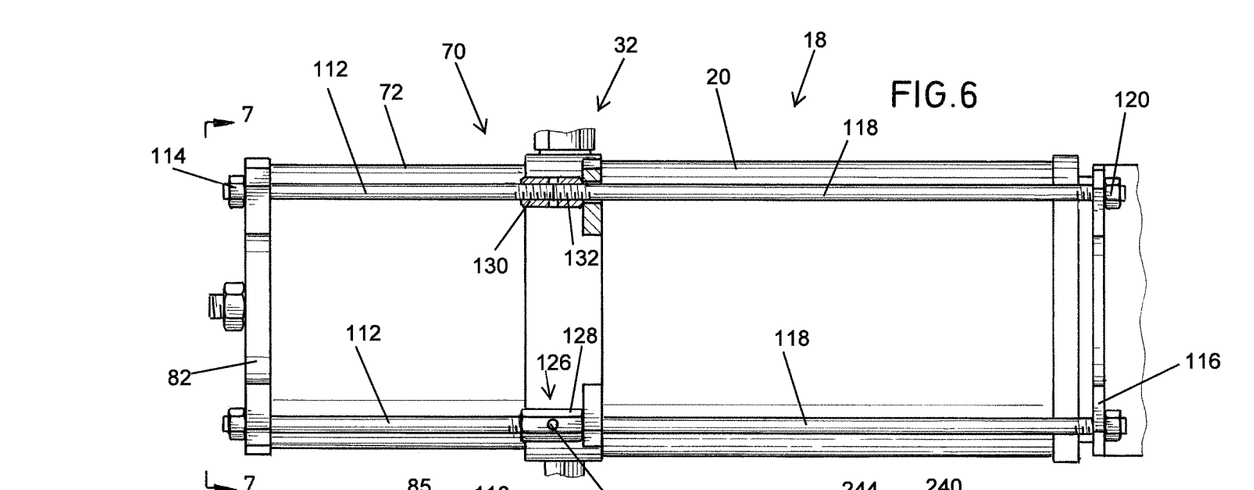
FIG. 6 is an elevational view, partly in section, showing the tie rod assemblies used to connect a force module to a tandem piston assembly.
Figure 7:
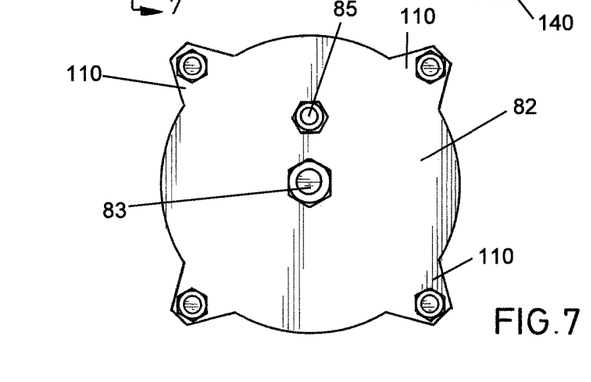
FIG. 7 is a view taken along the lines 7-7 of FIG. 6.

To assemble force assembly 10A comprised of force module 18 and tandem piston module 70, reference is now made to FIGS. 6 and 7. End cap 82 has four symmetrically patterned, laterally outwardly extending ear portions 110, each ear portion 110 having a hole therethrough. Received in each of the holes in ear portions 110 are tie rods 112 on which are threadedly received nuts 114. A second end cap 116, similar to end cap 82, is positioned between housing 12 and casing 20 and has laterally outwardly extending ear portions or projections through which are formed four symmetrically patterned holes, each of the holes in end cap 116 receiving a tie rod 118 on which are threadedly received nuts 120. In practice, when end caps 82 and 116 are properly positioned relative to cartridge 72 and casing 20, respectively, the symmetrically spaced holes in end cap 82 will be in register with the symmetrically spaced holes in end cap 116. Accordingly, respective ones of tie rods 112 and 118 can be brought into register with one another. To this end, and to connect respective tie rods 112 and 118 together, there are four 126 each having a body 128, body 128 being provided threaded bores 130 and 132 into which are received the threaded ends of registering tie rods 112 and 118, respectively. Each of the coupling nuts 126 is provided with a formation, e.g., an open bore, which serves as an indicator of proper engagement. It will be appreciated that the threaded bores 130 and 132 can both have right hand threads or one of the threaded bores 130, 132 can have left hand threads while the other of the bores could have right hand threads. Once the tie rods 112 have been coupled to the tie rods 118, the nuts 114 and 120 can be tightened, whereby force module 18, interface assembly 32, and tandem piston module 70 will be compressed together. As seen, the coupling nuts 126 have a hexagonal cross-sectional shape to allow for tightening/loosening by a wrench.

Figure 8:
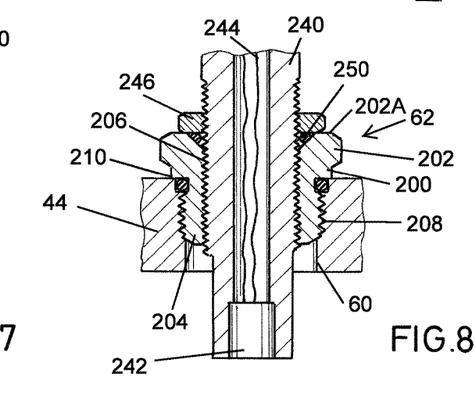
FIG. 8 is an enlarged view taken along the lines 8-8 of FIG. 1.

Referring now to FIG. 8, there is shown in greater detail, sensor adapter 62. Sensor adapter 62 is substantially a uniquely modified gland nut and comprises a body 200 having a flange portion 202 and an externally threaded stem 204. There is a threaded bore 206 extending through body 200. An annular, external seal ring groove is formed in body 200 generally at the juncture of flange portion 202 and stem portion 204. A seal ring 210 received in the seal ring groove ensures sealing between body 200 and flange 44 of interface assembly 32. There is a chamfered frustoconical surface formed in flange portion 202 adjacent top surface 202A of flange 202. A threaded sensor carrier 240 having a sensor 242 connected by wires 244 to a suitable electronic recording or indicating device is threadedly received in the threaded bore 206 of body 200. A threaded lock nut 246 on sensor carrier 240 engages and compresses an annular seal 250 positioned in the seal body recess formed by the combination of the frustoconical surface in flange 202, threaded lock nut 246, and sensor carrier 240 when sensor carrier 240 is threaded into adapter body 200. It will be appreciated that once sensor carrier 240 is threadedly received in adapter body 200, lock nut 246 can be tightened to further compress seal 250. As noted above, there is a stop 35 received in plate portion 34 of interface 32. As can be seen with reference to FIG. 2, stop 35 is used to limit the radially inward travel of sensor carrier 240 to ensure proper positioning of sensor 242 relative to indicator plate 90 when indicator plate 90 is in proximity to sensor 242.

Sensor 242 can be of various types. For example, sensor 242 can comprise a proximity sensor, e.g., a capacitive sensor or an inductive sensor, depending on the material of the target, e.g., indicator disc 90, being sensed. Non-limiting examples of proximity sensors include capacitive, inductive, magnetic, etc. It will also be recognized that sensor 242 can comprise a device such as a limit switch, a reed switch, etc. In general, any device on sensor carrier 240 which can detect the presence of indicator disc 90 when indicator disc 90 is in register with the device can be used.

Turning now to FIGS. 1, 3, 4, and 5, the operation of the actuator assembly of the present invention in conducting a partial stroke testing (PST) will be described. In the description which follows it will be assumed that the shaft 16 is connected to a quarter turn valve (not shown). In the position shown in FIG. 1, with the compression spring assembly in the relaxed position as shown in FIG. 1, the valve would be in the fully closed position.

In FIG. 3, pneumatic pressure which has been introduced via conduit 54, port 48, and passageway 50, urges piston 24 and hence piston rod 28 to the right as shown in FIG. 3, thereby compressing spring assembly 30. This can be considered the normal service position of the actuator in which the valve is fully opened. To conduct a PST, and with the valve in the fully open position, pneumatic pressure is introduced via fitting 85 to force tandem piston 76 and hence piston rod 78 carrying indicator plate 90 to the right as shown in FIG. 4. In this position, piston rod 78 extends into chamber 22 and indicator plate 90 has engaged the stop formed by hub 36. As can also be seen, indicator plate 90 is now in register with sensor 242. In other words, and by example only, assuming indicator plate 90 is of metallic construction, and assuming sensor 242 is an inductive type proximity sensor, the position of indicator plate 90 and hence the position of piston rod 78 can now be determined. In this regard, it should be noted that the end surface 78A of piston rod 78 stops short of contacting piston 24 to form a hard stop at a calculated distance from piston 24 with this distance being equal to the amount of travel piston 24 must incur to cause the valve and actuator to travel to the desired PST position. Pressure acting on piston 76 provides the necessary force to provide the hard stop on surface 78A.

Turning now to FIG. 5, the pressure has been exhausted from chamber 22 allowing spring assembly 30 to move piston 24 to the left, as shown in FIG. 5, until it engages stop surface 78A. It will also be recognized that in the position shown in FIG. 5, the valve has been partially closed, i.e., it has been stroked or throttled so that it has been moved a desired amount toward the closed position. Important to the operation, fully all of the pressure has been exhausted thereby allowing the actuator to exert full torque or force to the valve. This ensures that the valve is not stuck in the fully open position. Reapplying pressure to piston 24 will again push it to the right to compress the spring and to return the valve to the fully open position. With reference to FIG. 5, it should also be recognized that should an emergency situation occur, which requires the valve to be moved to the fully closed position, pressure from both piston chambers 22 and 74 can immediately be exhausted allowing compression spring assembly 30 to move both pistons 24 and 76 to the position shown in FIG. 1, thereby completely shutting the valve. As described above, because the indicator plate 90 may, by using the appropriate spacer height, be selectively positioned at any place along the length of piston rod 78, the precisely desired amount of stroking can be easily controlled.

Figure 9:
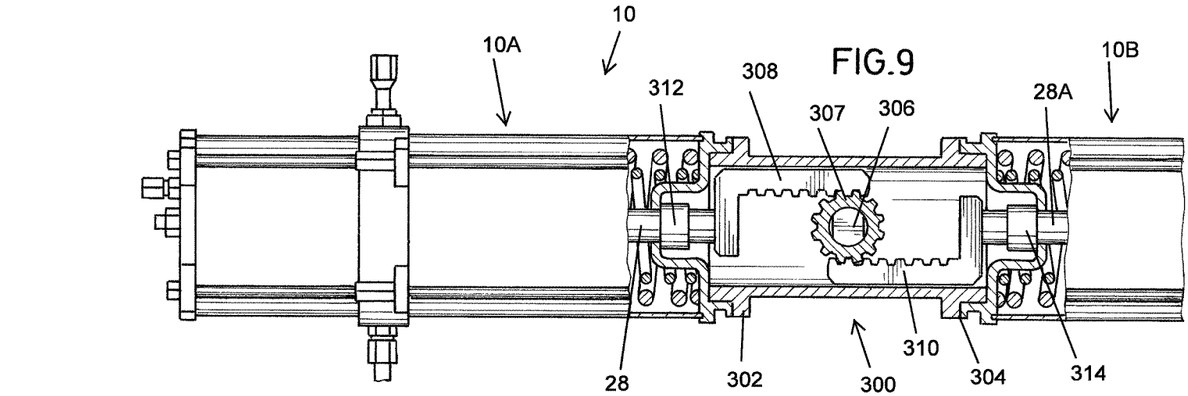
FIG. 9 is a bottom elevational view, partly in section showing another embodiment of the actuator assembly of the present invention.

Turning now to FIG. 9 there is shown an embodiment of the present invention in conjunction with a rack and pinion assembly. In the embodiment shown in FIG. 9, the actuator assembly 10, comprised of force assembly 10A and 10B, are substantially identical to those shown in FIG. 1. Accordingly, only the rack and pinion assembly will be described in detail. A housing 300 has one end 302 connected to force assembly 10A while a second end 304 is connected to force assembly 10B. Rotatably mounted in housing 300 is a shaft 306 connected to a pinion 307 such that as pinion 307 rotates, shaft 306 rotates. Engaged with pinion 307 are first and second racks 308 and 310, respectively. Rack 308 is interconnected by a coupling or linkage 312 to piston rod 28 while rack 310 is interconnected by a coupling or linkage 314 to piston rod 28A. It will be appreciated that as piston rods 28 and 28A reciprocate, they will reciprocate racks 308 and 310, respectively, with the result that pinion 307 will rotate and thereby rotate shaft 306.

Figure 10:
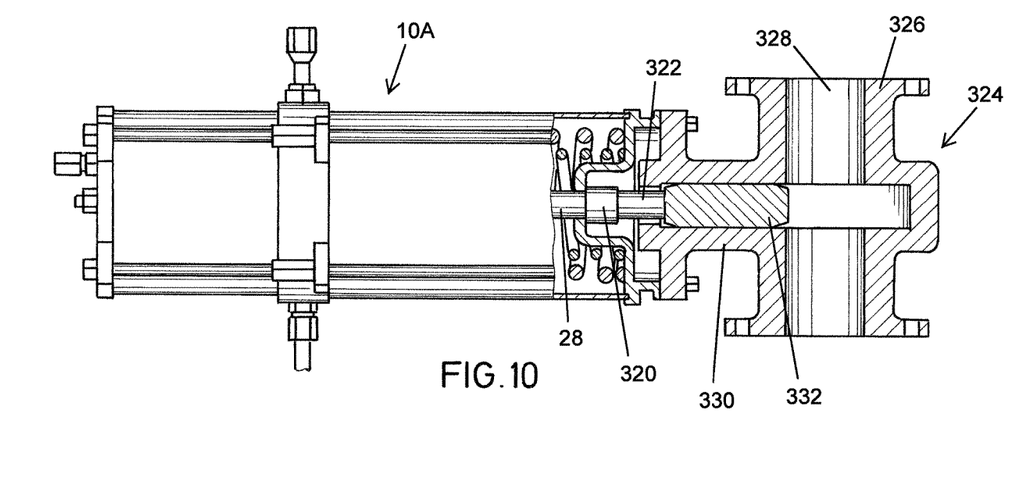
FIG. 10 is an elevational view, partly in section of another embodiment of the actuator assembly of the present invention involving the use of linear actuation.

Turning now to FIG. 10, there is shown an embodiment of the present invention involving linear actuation. In the embodiment shown in FIG. 10, piston rod 28 is interconnected via a coupling or linkage 320 to the shaft 322 of a gate valve shown generally as 324. Gate valve 324 has a body 326 with a throughbore 328 therethrough. Slidably disposed in the bonnet 330 of the gate valve 324 is a gate valve element 332 which can be reciprocated into and out of register with bore 328 to thereby open or close throughbore 328. It will be appreciated that FIG. 10 is a schematic representation and that the bonnet 330 would typically be of longer length and have a longer shaft 322 connected to gate valve element 332 to accommodate movement of the gate valve element 332.

The advantages of the actuator assembly of the present invention are many. For one, the assembly eliminates spurious valve travel during a PST while eliminating false failures. Additionally, the assembly allows full actuator torque output every cycle which is necessary when a valve is experiencing stiction. As noted above, the actuator assembly of the present invention also permits full emergency operation in the event of the need of an emergency shutdown. The actuator assembly also permits an unlimited number and frequency of worry-free PST cycles which is important because increased cycles and frequency further assures proper valve action if emergency shut down is required.

Another distinct advantage of the actuator assembly of the present invention is its modular construction. For example, the body 12 and force module 18 could be fully assembled using tie rods 118 and nuts 130 following which tandem piston module 70 could be connected. This would allow body 12 and force module 18 to remain intact in the event it was desired to remove module 70 for maintenance. Additionally, it will be appreciated that force module 18 could also be removed from the system and disassembled for maintenance. The system allows tandem piston module 70 and module 18 to be worked on independently while module 18 remains intact. The unique construction of the actuator assembly of the present invention vis-à-vis modularity is also demonstrated by the fact that one can purchase the actuator assembly sans the tandem piston module 70 and at a later date install the tandem piston module 70 simply by removing the end cap which would have been connected to casing 20 using tie rods and nuts as described above. In this case, the end cap removed from casing 20 could be used as the end cap for cartridge 72, e.g., end cap 82.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. An actuator assembly comprising:
   a movable output shaft;
   a force module, said force module comprising:
      a casing having a first end, and a second end, said casing defining a first piston chamber;
      a first piston mounted in said first piston chamber for reciprocal movement therein;
      a first piston rod connected on a first end to said first piston and operatively connected on a second end to said movable shaft whereby reciprocal motion of said first piston causes movement of said movable shaft;
   a tandem piston module, said tandem piston module comprising first piston rod:
      a cartridge having a first end, a second end, and forming a second piston chamber;
      a second piston mounted in said second piston chamber for reciprocal movement therein;
      a second piston rod connected to said second piston for reciprocal movement with said second piston;
      an indicator plate connected to said second piston rod and selectively positionable along the length of said second piston rod, at least one spacer being positioned between and engaged with said indicator plate and said second piston;
   an interface assembly positioned between said first end of said cartridge and said second end of said casing, said interface assembly comprising:
      a plate portion having a first side, and a second side, said first side being proximal said second end of said casing, said plate portion having an opening therethrough allowing reciprocal motion of said second piston rod through said plate portion;
      an annular, axially extending flange projecting from said second side of said plate portion and having a peripheral surface;
      a sensor port extending radially through said peripheral surface of said flange and providing open communication with said second piston chamber;
      a fluid port extending radially through said peripheral surface of said flange and providing open communication with said first piston chamber.

2. The actuator assembly of claim 1, wherein said indicator plate has a releasable locking assembly to secure said indicator plate to said second piston rod at a predetermined position on said second piston rod.

3. The actuator assembly of claim 1, wherein said indicator plate comprises a generally circular disc having an aperture therethrough for receipt of said second piston rod.

4. The actuator assembly of claim 3, wherein said disc has a front side, a back side and a peripheral surface, there being a channel formed in said disc and extending from said front side to said back side, said channel having a first end terminating at said aperture, said channel cooperating with said aperture to form a radially deflectable finger;
   a threaded bore extending through said peripheral surface and being in open communication with said channel, and a set screw received in said threaded bore and engageable with said finger whereby said set screw can force said finger radially inwardly in engagement with said second piston rod to secure said disc to said second piston rod.

5. The actuator assembly of claim 4, wherein said channel has an arcuate portion.

6. The actuator assembly of claim 1, wherein there is a stop formed on said plate portion and extending axially toward said indicator plate to limit movement of said indicator plate.

7. The actuator assembly of claim 6, wherein said stop comprises a generally centrally disposed hub projecting axially from said second side of said plate portion, said opening being formed through said hub.

8. The actuator assembly of claim 1, wherein there is a passageway formed in said flange, said passageway being in open communication with said first piston chamber and said fluid port.

9. The actuator assembly of claim 1, further comprising:
a first cap positioned between said housing and said first end of said casing, said first cap having a plurality of first symmetrically spaced laterally outwardly projecting portions, there being a first cap hole in each of said first laterally outwardly projecting portions;
a second cap positioned adjacent said second end of said cartridge, said second cap having a plurality of second symmetrically spaced laterally outwardly extending portions, there being a second cap hole in each of said second laterally outwardly extending portions;
a first tie rod received through each of said first cap holes and extending longitudinally along the length of said casing;
a second tie rod received through each of said second cap holes and extending longitudinally along the length of said cartridge;
a coupling nut intermediate respective ones of said first and second tie rods, said coupling nut threadedly receiving said tie rods.

10. The actuator assembly of claim 9, wherein each of said coupling nuts is engageable by a tool to rotate said coupling nuts about an axis passing through said tie rods received in said coupling nuts, rotation of said coupling nuts urging respective ones of said threadedly engaged first tie rods and said threadedly engaged second tie rods toward one another.

11. The actuator assembly of claim 1, wherein there is a sensor adaptor received in said sensor port, said sensor adapter comprising a body portion with an internal, threaded throughbore, and an externally threaded portion, said body including a radially outwardly extending flange, an outwardly tapered throat formed in said flange in surrounding relationship to said threaded bore and an external annular seal ring groove being formed adjacent said externally threaded portion of said body.

12. The actuator assembly of claim 11, further comprising:
a first annular seal ring received in said external groove, an externally threaded sensor support member threadedly received in said threaded bore, said tapered throat and said sensor support member cooperating to form a seal ring recess;
a second annular seal ring received in said seal ring recess; and
a threaded lock nut received on said threaded sensor support member and engageable with said seal in said seal ring recess.

13. The actuator assembly of claim 1, further comprising a housing, said first end of said casing being interconnected to said housing, a scotch yoke assembly mounted in said housing, said scotch yoke assembly including a yoke connected to said shaft for rotation therewith, said first piston rod being operatively connected to said yoke whereby reciprocal movement of said first piston rod causes rotational movement of said yoke.

14. The actuator assembly of claim 1, further comprising a housing, said first end of said casing being interconnected to said housing, a rack and pinion assembly mounted in said housing, said pinion being connected to said shaft for rotation therewith, said rack being interconnected to said first piston rod whereby reciprocal motion of said piston rod causes reciprocal motion of said rack and rotational movement of said pinion.

15. The actuator assembly of claim 1, wherein said shaft is mounted for reciprocal movement, a coupling interconnecting said shaft and said first piston rod whereby reciprocal movement of said first piston rod causes reciprocal movement of said shaft.

16. A scotch yoke actuator assembly comprising:
a yoke housing having a first face and a second, opposite face;
a dual yoke assembly mounted in said housing, said dual yoke assembly including a yoke rotatably mounted in said housing, and a shaft connected to said yoke for rotation therewith;
a first force module, said first force module comprising:
a first casing having a first end interconnected to said first face of said housing, and a second end, said first casing defining a first piston chamber;
a first piston mounted in said first piston chamber for reciprocal movement therein;
a first piston rod connected on a first end to said first piston and operatively connected on a second end to said yoke whereby reciprocal motion of said first piston causes rotational movement of said yoke;
a first tandem piston module, said first tandem piston module comprising:
a first cartridge having a first end, a second end, and forming a second piston chamber;
a second piston mounted in said second piston chamber for reciprocal movement therein;
a second piston rod connected to said second piston for reciprocal movement with said second piston;
a first indicator plate connected to said second piston rod and selectively positionable along the length of said second piston rod, at least one first spacer being positioned between and engaged with said first indicator plate and said second piston:
a first interface assembly positioned between said first end of said first cartridge and said second end of said first casing, said first interface assembly comprising:
a first plate portion having a first side, and a second side, said first side being proximal said second end of said first casing, said first plate portion having an opening therethrough allowing reciprocal motion of said second piston rod through said first plate portion;
an annular, axially extending first flange projecting from said second side of said first plate portion and having a peripheral surface;
a first sensor port extending radially through said peripheral surface of said first flange and providing open communication with said second piston chamber;
a first fluid port extending radially through said peripheral surface of said first flange and providing open communication with said first piston chamber;

a second force module, said second force module comprising:
- a second casing having a first end connected to said second face of said housing, and a second end, said second casing defining a third piston chamber;
- a third piston mounted in said third piston chamber for reciprocal movement therein;
- a third piston rod connected on a first end to said third piston and operatively connected on a second end to said yoke whereby reciprocal motion of said third piston causes rotational movement of said yoke;

a second tandem piston module, said second tandem piston module comprising:
- a second cartridge having a first end, a second end, and forming a fourth piston chamber;
- a fourth piston mounted in said fourth piston chamber for reciprocal movement therein;
- a fourth piston rod connected to said fourth piston for reciprocal movement with said fourth piston;
- a second indicator plate connected to said fourth piston rod and selectively positionable along the length of said fourth piston rod, at least one second spacer being positioned between and engaged with said second indicator plate and said fourth piston;

a second interface assembly positioned between said first end of said second cartridge and said second end of said second casing, said second interface assembly comprising:
- a second plate portion having a first side, and a second side, said first side being proximal said first end of said second casing, said second plate portion having an opening therethrough allowing reciprocal motion of said fourth piston rod through said second plate portion;
- an annular, axially extending second flange projecting from said second side of said second plate portion and having a peripheral surface;
- a second sensor port extending radially through said peripheral surface of said second flange and providing open communication with said fourth piston chamber;
- a fluid port extending radially through said peripheral surface of said second flange and providing open communication with said third piston chamber.

17. A rack and pinion actuator assembly comprising:
a housing having a first face and a second, opposite face;
a shaft rotatably mounted in said housing;
a double rack and pinion assembly mounted in said housing, said pinion being connected to said shaft for rotation therewith, first and second racks engaged with said pinion;
a first force module, said first force module comprising:
- a first casing having a first end interconnected to said first face of said housing, and a second end, said first casing defining a first piston chamber;
- a first piston mounted in said first piston chamber for reciprocal movement therein;
- a first piston rod connected on a first end to said first piston and operatively connected on a second end to said first rack whereby reciprocal motion of said first piston causes reciprocal movement of said first rack;

a first tandem piston module, said first tandem piston module comprising:
- a first cartridge having a first end, a second end, and forming a second piston chamber;
- a second piston mounted in said second piston chamber for reciprocal movement therein;
- a second piston rod connected to said second piston for reciprocal movement with said second piston;
- a first indicator plate connected to said second piston rod and selectively positionable along the length of said second piston rod, at least one first spacer being positioned between and engaged with said first indicator plate and said second piston:

a first interface assembly positioned between said first end of said first cartridge and said second end of said first casing, said first interface assembly comprising:
- a first plate portion having a first side, and a second side, said first side being proximal said second end of said first casing, said first plate portion having an opening therethrough allowing reciprocal motion of said second piston rod through said first plate portion;
- an annular, axially extending first flange projecting from said second side of said first plate portion and having a peripheral surface;
- a first sensor port extending radially through said peripheral surface of said first flange and providing open communication with said second piston chamber;
- a first fluid port extending radially through said peripheral surface of said first flange and providing open communication with said first piston chamber;

a second force module, said second force module comprising:
- a second casing having a first end connected to said second face of said housing, and a second end, said second casing defining a third piston chamber;
- a third piston mounted in said third piston chamber for reciprocal movement therein;
- a third piston rod connected on a first end to said third piston and operatively connected on said second rack whereby reciprocal motion of said third piston causes reciprocal movement of said second rack;

a second tandem piston module, said second tandem piston module comprising:
- a second cartridge having a first end, a second end, and forming a fourth piston chamber;
- a fourth piston mounted in said fourth piston chamber for reciprocal movement therein;
- a fourth piston rod connected to said fourth piston for reciprocal movement with said fourth piston;
- a second indicator plate connected to said fourth piston rod and selectively positionable along the length of said fourth piston rod, at least one second spacer being positioned between and engaged with said second indicator plate and said fourth piston;

a second interface assembly positioned between said first end of said second cartridge and said second end of said second casing, said second interface assembly comprising:
- a second plate portion having a first side, and a second side, said first side being proximal said first end of said second casing, said second plate portion having an opening therethrough allowing reciprocal motion of said fourth piston rod through said second plate portion;
- an annular, axially extending second flange projecting from said second side of said second plate portion and having a peripheral surface;
- a second sensor port extending radially through said peripheral surface of said second flange and providing open communication with said fourth piston chamber;

a fluid port extending radially through said peripheral surface of said second flange and providing open communication with said third piston chamber.

* * * * *